Dec. 25, 1962 C. O. KREUTZER 3,069,797
METHOD OF AND MEANS FOR ELECTRO-INFLUENCING LIVING CREATURES
Filed Feb. 15, 1961 2 Sheets-Sheet 1

INVENTOR.
CONRADIN O. KREUTZER
BY
Arthur Robert
ATTORNEY

Dec. 25, 1962　　　C. O. KREUTZER　　　3,069,797
METHOD OF AND MEANS FOR ELECTRO-INFLUENCING LIVING CREATURES
Filed Feb. 15, 1961　　　2 Sheets-Sheet 2

INVENTOR.
CONRADIN O. KREUTZER
BY
ATTORNEY

United States Patent Office 3,069,797
Patented Dec. 25, 1962

3,069,797
METHOD OF AND MEANS FOR ELECTRO-INFLUENCING LIVING CREATURES
Conradin Otto Kreutzer, Lewes, Del., assignor to Smith Research and Development Company, Inc., Lewes, Del., a corporation of Delaware
Filed Feb. 15, 1961, Ser. No. 89,550
Claims priority, application Germany Feb. 22, 1960
10 Claims. (Cl. 43—4.5)

This invention relates to the art of electro-influencing certain known living creatures, such as fish.

While the invention may be variously applied, it is particularly suited for use in electrified fish-pump arrangements for recovering fish, which are trapped within a watery pocket providing them with swimming room but preventing them from escaping. In an arrangement of this character, the suction inlet of a fish-pump is provided with an anode and submerged in the pocket and the waters thereof are electrified with an electro-fishing current of such strength and direction as to create an electrical field having an electro-taxis section extending around the anode and causing the trapped fish to swim toward and congregate at the suction inlet anode where they can be sucked into the pump.

It is desirable to maximize the radial thickness of the electro-taxis section, i.e., maximize the reach over which the electrical field thus produced is effective to compel fish to swim toward the suction inlet anode until they reach a point where they can be sucked into the pump. This can be accomplished by increasing the current discharge density of the anode. But the increase in reach, which is thus possible, is limited to current density values below those which create an objectionable electro-narcosis section in the waters between the anode and the inner limit of the electro-taxis section. In the electro-narcosis section, the fish are stunned and sometimes killed and if this occurs when they are out of reach of the pump, such fish cannot be recovered by the pump.

This limitation, which is imposed upon the current density of the anode, not only restricts the maximum radial thickness of the electro-narcosis section either to zero or to a value ranging from zero to slightly above zero but it also restricts the maximum radial thickness or reach of the electro-taxis section to a relatively small value in salt water operations. As a result, it is not practical to operate an electrified fish-pump arrangement in a purse seine immediately after the seine is "set" around a school of fish. On the contrary, the seine must be reduced in size until its waters can be effectively electrified. This does not mean that the electro-taxis section around the suction inlet anode must be large enough to embrace all of the waters of the purse seine because the cathode can be used to set up a fish repelling field in one part of the net waters while the anode sets up a fish attracting field in another part thereof. The fish within the net can be successfully pumped out when these two fields together occupy a substantial portion of the net waters. This is particularly true in cases where it is possible to move either or both electrodes to different locations within the net waters.

The principal object of the present invention is to provide a means for increasing the effective reach of the electric field without stunning the fish before they are within effective reach of the suction inlet of the pump or without stunning them at all if that be desired.

Another important object of the present invention is to achieve the principal object by means of a simple and relatively inexpensive electrical arrangement.

These objects are achieved, in accordance with my invention, by arranging a second electrical system to create a second electro-axis field section which extends outwardly from the electro-taxis section of the first system. More particularly, I provide a second anode, arrange it to extend angularly about the first anode in outwardly spaced relation thereto, provide a cathode for the second system which is spaced outwardly in relation to both of the first and second anodes and then energize the anode and cathode of the second system to create a second electro-taxis section around the second anode.

The radial thickness or reach of the electro-taxis section of the second electrical field extends over the distance required to reduce its current to the operable minimum which, in the case of Menhaden, approximates 9.7 milliamps per square inch of current flow area. As a consequence, I have found that the second field operates as an extension of the first field because fish within the effective reach of the second field will swim to the first anode. Obviously, if desired, a third anode may be located along an outer portion of the effective reach of the second field to provide a total effective reach of still greater proportions.

In this connection, it may be noted that, where the current discharge rates of both anodes, are the same, the effective reach of each successive field is larger than the effective reach of the preceding field. For example, the effective reaches of the first, second and third fields may be say, 1½ feet, 6 ft., and 10½ ft., respectively. Collectively they are capable of producing an effective reach of 18 ft. By progressively increasing the effective reach in this manner, it becomes possible to pump out purse seine pockets of progressively larger sizes.

Figures 2, 4:
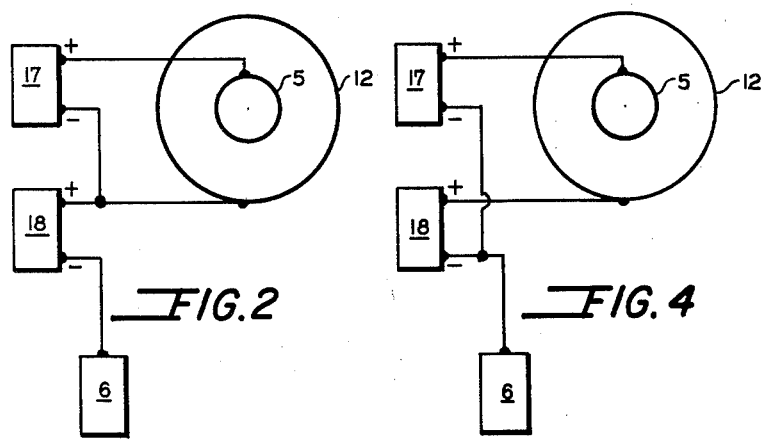
FIG. 2 is a wiring diagram of one circuit embodiment of the fishing apparatus.
Figure 3:
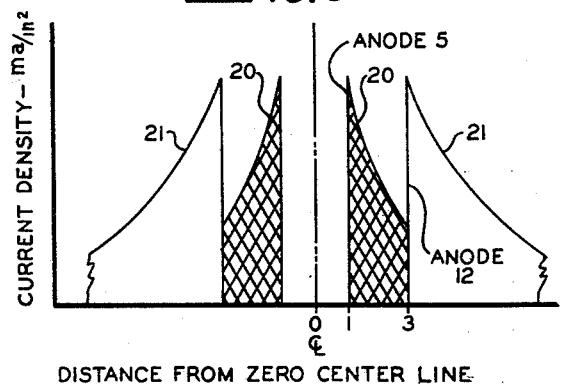
Figure 5:
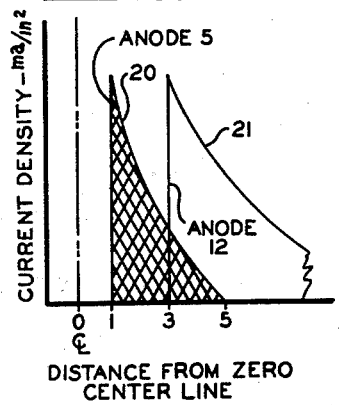

FIG. 3 graphically illustrates relative positions of the two electrical fields produced by the FIG. 2 circuit and the gradients of their respective current intensities;

FIG. 4 is a wiring diagram of another circuit embodiment of the apparatus;

FIG. 5 is a graph, similar to FIG. 3, for the FIG. 4 circuit; and

Figure 6:
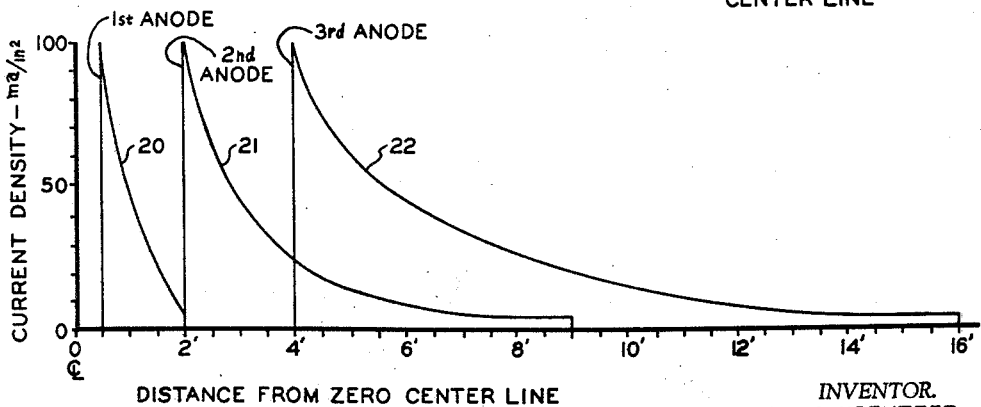

FIG. 6 is a graph, similar to FIG. 5, for a triple anode circuit.

In the charts of FIGS. 3, 5 and 6, the "center point" of all spherical anodes is located on the abscissa at the zero point marked "0." For the sake of clarity, this zero point on the abscissa is projected upwardly as an ordinate and designated the "zero center line."

Figure 1:
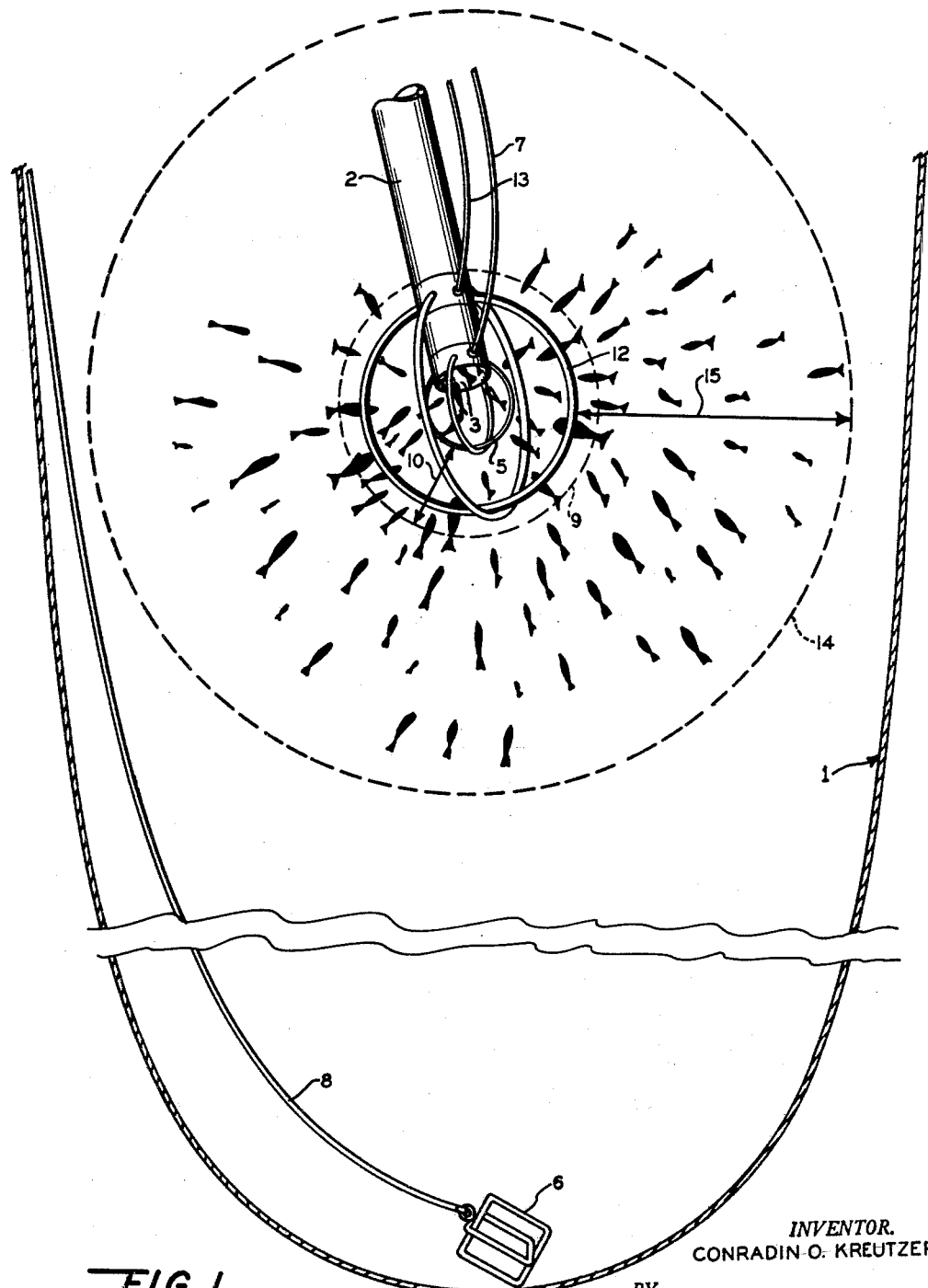
FIG. 1 is a vertical section showing, in elevation, one electrode arrangement embodying the invention and being used to remove fish which are trapped in a purse seine net.

My invention is shown in FIG. 1 as being used in removing fish from a conventional purse seine net 1 which has previously been "pursed" around a school of fish. The fish are pumped into a flexible hose 2, through a suction inlet end 3, and deposited in the hold of a fishing ship (not shown) which carries the hose 2 and is floating beside the net. A pump (not shown) on the fishing ship provides the hose 2 with the necessary suction to draw the fish from the water and into the ship hold.

A first or central anode 5 is mounted on the inlet end 3 of the hose 2. A convenient way of mounting the anode 5 on the hose is to fix it to a sleeve clamped about the hose 2. A cathode 6 is spaced at some distance away from the anode 5. A convenient manner of locating the cathode 6 is to let it rest in the bottom of the net, although it may be located elsewhere inside or outside of the pocket of the net.

The central anode 5, as shown in FIG. 1, is composed of a pair of circular rings arranged so that one ring is located inside of (and at a right angle to) the other. The cathode 6 is substantially of the same type of "crossed ring" construction, except that square cathode rings are shown simply to differentiate them from the anode rings. The anode 5 is electrically energized through a wire 7 and the cathode through a wire 8.

Energizing the anode 5 and cathode 6 with a direct current produces, around the anode, an electrical field which spreads out from the anode 5 as its center. Although, the anode 5 is of the "crossed ring" construction, it acts electrically about the same as if it were a solid sphere of the same diameter.

The precise shape of this electrical field or of its electro-taxis section is not known. It may resemble a true sphere or a greatly distorted version of a true sphere. However, for the sake of simplicity and clarity, we assume that the field as a whole and its electro-taxis section are both in the form of true spheres and therefore show the outer limit of the electro-taxis section, in FIG. 1, as extending along the circular line 9. With this showing, the effective reach of the anode 5 may be indicated by the line 10, which extends radially between anode 5 and the outlying circle 9.

Increasing the current density at the surface of the anode enlarges the electrical field. It also enlarges the effective reach 10 of the field so long as the field intensity is high enough to produce an "electro-taxis" section around the anode and low enough to avoid producing an objectionable "electro-narcosis" section between the anode and the electro-taxis section. (See my U.S. Pat. #2,792,-659.) As the current density of the anode is increased, it ultimately reaches a value high enough to establish an intervening electro-narcosis section. This may not matter if the narcosis section is so small that the fish are not stunned before they come within the effective reach of the pump suction. Hence, the current density at the anode 5 should be limited to a value which, if exceeded, will be detrimental to the fish pumping operation.

The maximum value of this limited current density varies with the size and species of fish. For example, I have found that porgy of average size can withstand a current density of about 27.8 ma./in.$^2$ before becoming stunned; flounder about 53 ma./in.$^2$; menhaden about 97 ma./in.$^2$; and sand shark about 103 ma./in.$^2$.

Where the radial thickness or reach of the electro-taxis section provided by these values for these particular species of fish or by corresponding values applied to other species of fish, is too small, it may be enlarged in accordance with the present invention. Accordingly, the first anode 5 may be partially or completely encircled by a second anode 12 which is in outwardly spaced relation to the first anode 5. Like the first anode 5, the second anode 12 may be of the "crossed ring" construction (or of some other open network construction) to provide the desired electrical field effect of a spherical anode while allowing fish to pass through it. The second anode may be conveniently mounted on the hose 2 in a manner similar to the first anode 5, i.e., it may be fixed to a sleeve clamped to the hose 2 above the hose inlet 3. Care must be observed to insulate the two anodes electrically from each other. The second anode is energized through the wire 13.

The second anode 12 and the first cathode 6 are electrically connected across and energized by a second direct current source. Preferably, the current density at the surface of the second anode does not appreciably exceed the maximum value which can be used without stunning the fish, so that the effective reach will be at a maximum. Again, for the sake of simplicity and clarity, we assume that the second field, as a whole, and its electro-taxis section are both in the form of true spheres and, therefore, show the outer limits of the second electro-taxis section, in FIG. 1, as extending along circular line 14. With this assumption, its radial thickness or reach is indicated by line 15 running from anode 12 to circular line 14.

If a first "spherical" anode 5 having a diameter of about 32" is energized with a current density of about 97 milliamps per inch square, its effective reach for menhaden will approximate 8'. Likewise if a second spherical anode 12 having a diameter of about 100" is energized with the same current density, it will have an effective reach approximating 21'. Thus the collective effective reach of these anodes approximates 24' comprising the 21' reach of the outer anode plus the spacing between the outer and inner anodes which approximates 3'.

Two circuits for energizing double anode arrangements are illustrated in the drawing. Each anode is energized from a separate direct current source. These include a first source 17 for the first anode 5 and a second source 18 for the second anode 12. Preferably, both sources 17 and 18 produce spaced direct current impulses having the characteristics of a capacitor discharge impulse and an impulse frequency rate best suited for the type of fish being performed. An example of a suitable impulse generator, which may be used for each source 17 and 18, is described in my U.S. Pat. No. 2,836,735, issued May 27, 1958.

In the FIG. 2 circuit, the positive and negative terminals of the first source 17 are connected respectively to the inner and outer anodes 5 and 12 while the positive and negative terminals of the second source 18 are connected respectively to the outer anode 12 and the cathode 6, which is located outwardly in relation to both anodes. The two sources 17 and 18 are preferably operated so that the current impulses of each are spaced from and between the impulses of the other source. Hence, only one source is discharging an impulse at any single instant. As a result, an impulse discharged by the first source 17 flows through the water between the anodes 5 and 12, causing the second anode 12 to act as a cathode. Also an impulse discharged by the second source 18 flows through the water between the second anode 12 and the cathode 6.

FIG. 3 shows: along its abscissa, the relative diameters of the smaller spherical anode 5 and the larger spherical anode 12; and, along its ordinate, how the current density of the first field decreases from the surface of the inner anode 5 outwardly (see FIG. 3, line 20) to the surface of the much larger anode 12 and how the current density of the second field decreases from the surface of the anode 12 outwardly (see FIG. 3, line 21) in the same direction as the first field. Inasmuch as the anode 12 is the cathode for the anode 5, the electrical field of the inner anode 5 stops when it reaches the outer anode 12.

The electrical circuit shown in FIG. 4 differs from that of FIG. 2 in that the FIG. 4 circuit uses one cathode 6 for both anodes 5 and 12. As a result of this difference, the electro-taxis section of the first anode 5 can extend beyond the second anode 12 as indicated in FIG. 5.

FIG. 6 illustrates the electro-taxis field relationship of three successively larger anodes of spherical, or semi-spherical or parti-spherical shape. Again for the sake of clarity, we will assume: that truly spherical anodes are used; and that a truly spherical electro-taxis section is created by each anode. With these assumptions, it will be noted that the radii of these three anodes from the zero center point are 0.5', 2' and 4' respectively. The current intensities of their respective electro-taxis sections decrease along lines 20, 21 and 22 respectively. The radial thicknesses or reaches of their respective electro-taxis sections from the corresponding anode electrode are 1½', 7' and 12' respectively.

It will be noted that the second anode in FIG. 6 extends spherically along the outer spherical limits of the electro-taxis section of the first anode. The third anode, however, is positioned with its electro-taxis section overlapping a substantial portion of the electro-taxis section of the second anode. But, the third anode could be arranged to coincide at the 9' mark with the spherical limit of the electro-taxis section of the second anode in which event it would have to be increased in size. Also, it would have to be energized with a large increase in power to bring its current density up to 100 milliamps per square inch if that be desired. Where an overall reach of no more than 16' is desired, the use of the smaller third anode shown (with its smaller current consumption) is preferred because of the economy thereby effected in the manufacture, operation and maintenance of such three anode arrangement.

The art of electro-influencing living creatures, to which the present invention relates, includes, among other things, the electro-fencing art wherein fish are "electrically" repelled from a cathode in a given area by means of a unipolar current, i.e., by "electrifying" that cathode area with an electrical current of unchanging polarity such as sustained D.C. or impulse D.C., and the electro-fishing art wherein fish are "electrically" attracted toward an anode in a given area by "electrifying" that area with a unipolar current of the same character i.e., D.C. impulse current of the electro-fishing type. Where the present invention is used to provide strong repulsion areas of enlarged size around cathode electrodes, the field intensities employed may be large enough to stun the fish. Such an arrangement may be useful either in more effectively repelling fish from a given area or in more effectively herding them in another direction toward a desired area or pocket.

By "D.C. impulse current of the electro-fishing type," I mean a direct current of the spaced impulse type disclosed (or usable in electro-fishing apparatus or operations of the character disclosed) in prior U.S. patents on electro-fishing subjects matter. Among these are: #2,764,832 dated Oct. 2, 1956; #2,792,659 dated May 21, 1957; #2,836,735 dated May 27, 1958; #2,850,832 dated Sept. 9, 1958; and #2,850,833 dated Sept. 9, 1958.

In the specific embodiment represented by FIGS. 1 and 2, it will be appreciated that it physically embraces three electrodes which function electrically as four electrodes. For example, the first electrical system includes anode 5 and "cathode" 12 while the second electrical system includes "anode" 12 and cathode 6, it being understood that the single electrode 12 operates electrically as a cathode for the first sytsem and as an anode for the second system.

The specific embodiment represented by FIGS. 1 and 4 embraces three physical electrodes which function electrically as four electrodes. Thus, electrode 6 not only functions as a cathode for the first system but also functions independently as a cathode for the second system.

A specific electrode arrangement is not shown for FIG. 6 but here it will be appreciated that five physical electrodes of progressively larger "spherical" size may be provided to function electrically as six electrodes. For example: the first system may use the first and second anodes as its anode and cathode respectively; the second system may use the second anode at the 2' radius mark and a second cathode at the 9' radius mark; while the third system may use the third anode at the 4' radius mark and a third cathode at the 16' radius mark.

Having described my invention, I claim:

1. In the art of electro-influencing certain known living creatures in freely movable contact with a physical medium such as land or water, wherein a first electrical system, having a pair of spaced anode-cathode electrodes including a first electrode of one electrical sign, is operative to electrify said medium with direct current of such magnitude as to create around said first electrode an electrical field of said one electrical sign having an effective reach extending from said first electrode outwardly through said medium over a predetermined distance in which it is effective to constrain said known living creatures, in contact with that portion of said medium which is embraced by its effective reach, to move in one predetermined direction relative to said first electrode, an improvement for increasing the distance over which said living creatures are constrained to move in said predetermined direction, comprising: a second electrical system, having a pair of spaced anode-cathode electrodes, including a third openwork electrode which is larger in size than but of the same electrical sign as said first electrode and which is arranged to extend angularly about said first electrode in outwardly spaced relation thereto; said second system also including a fourth electrode which is spaced outwardly in relation to both of said first and third electrodes; said second system being operative, when energized, to electrify said medium with direct current of such magnitude as to create around said third electrode an electrical field of said one electrical sign having an effective reach extending outwardly relative to the first electrode and outwardly from said third electrode through said medium over a predetermined distance in which it is effective to constrain said known living creatures, in contact with that portion of said medium which is embraced by the effective reach of the third electrode, to move in said one predetermined direction relative to both the third and first electrodes.

2. The improvement of claim 1 including: means for correlatively operating said first and second systems so that the second system operates to extend the effective reach of the first system.

3. An improved apparatus of the electric-influencing type for producing electro-taxis sections around submerged anodes in order to attract certain living creatures, comprising: a first electrical system of the electro-influencing type, having a pair of electrodes, including a first anode and a first cathode, which is adapted to be operatively positioned in submerged and spaced relationship, and first means for energizing said first electrodes, when they are operatively positioned, to electrify the water with a direct current of such magnitude and direction as to create around said first anode an electrical field having an outwardly reaching electro-taxis section; and a second electrical system of the electro-influencing type, having a second pair of electrodes, including a second anode and a second cathode, which are adapted to be operatively positioned in submerged and spaced relationship wherein the second anode extends angularly about said first anode in outwardly spaced relation thereto and said second cathode is spaced outwardly in relation to both of said first and second anodes, and second means for energizing said second electrodes, when they are operatively positioned, to electrify the water with another current of such magnitude and direction as to create around said second anode an electrical field having an electro-taxis section which reaches outwardly in relation to both of said first and second anodes.

4. The apparatus of claim 3 wherein: said first electrical system is operative to produce said first electro-taxis section with a reach extending outwardly to at least the inner limit of the second electro-taxis section.

5. The apparatus of claim 4 wherein: said second electrical system is operative to produce said second electro-taxis section with a reach extending outwardly beyond the outer limit of the said first electro-taxis section.

6. The apparatus of claim 5 wherein said first and second means energize said first and second electrodes with spaced D.C. impulses of the electro-fishing type.

7. The apparatus of claim 6 wherein said first and second means are coordinated in operation so that the current impulses of each are spaced from the current impulses of the other.

8. An improved method of electro-influencing certain known living creatures in freely movable contact with a physical medium such as land or water, comprising: electrifying said medium with direct current of such magnitude as to create a first electrical field which extends somewhat spherically about a first electrical center, said field being of one electrical sign and extending from an inner portion of high electrical intensity in one part of said medium outwardly to an outer portion of relatively low electrical intensity; and electrifying said medium with another direct current of such magnitude as to create a second electrical field which extends somewhat spherically about said first electrical center, said second field being of said one electrical sign and extending from an inner portion of high intensity, which coincides with the outer portion of the first field, outwardly to an outer portion of relatively low intensity.

9. An improved method of the electro-influencing type for producing electro-taxis sections around submerged anodes in order to attract certain living water creatures, comprising: electrifying said water with direct current of such magnitude as to create a first electrical field having a first electro-taxis section which extends somewhat spherically about a first electrical center, and, with relation to said center, extends from its inner portion of high electrical intensity outwardly to its outer portion of relatively low electrical intensity; and electrifying said water with another direct current of such magnitude as to create a second electrical field having a second electro-taxis section which extends somewhat spherically about said first electrical center, and with relation to said center, extends outwardly with its inner portion of high intensity coinciding with the outer portion of the first section.

10. An improved method of the electro-influencing type for producing electro-taxis sections around submerged anodes in order to attract certain living water creatures, comprising: providing a first electrical system of the electro-influencing type, having a pair of electrodes, including a first anode and a first cathode; operatively positioning said anodes in submerged spaced relationship; energizing said operatively positioned electrodes to electrify the water with a direct current of such magnitude and direction as to create around said first anode an electrical field extending somewhat spherically around a first electrical center and having outwardly reaching electro-taxis section; providing a second electrical system of the electro-influencing type, having a second pair of electrodes, including a second anode and a second cathode; operatively positioning said second pair of electrodes in submerged spaced relationship wherein the second anode extends somewhat spherically about said first anode and in outwardly spaced relationship thereto and said second cathode is spaced outwardly in relation to both of said first and second anodes; and energizing said operatively positioned second electrodes to electrify the water with a second current of such magnitude and direction as to create around said second anode an electrical field extending somewhat spherically around said first electrical center and having an electro-taxis section which reaches outwardly in relation to both of said first and second anodes.

References Cited in the file of this patent
UNITED STATES PATENTS 2,795,883   Ras _____ June 18, 1957